(12) United States Patent
Joshi et al.

(10) Patent No.: US 8,504,815 B2
(45) Date of Patent: *Aug. 6, 2013

(54) METHOD OF USING AN INFORMATION HANDLING SYSTEM HAVING A BOOT FILE, AND AN INFORMATION HANDLING SYSTEM AND MACHINE-EXECUTABLE CODE FOR CARRYING OUT THE METHOD

(75) Inventors: Anand P. Joshi, Round Rock, TX (US); Samer El Haj Mahmoud, Austin, TX (US); Wai-Ming Richard Chan, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/450,772

(22) Filed: Apr. 19, 2012

(65) Prior Publication Data
US 2012/0204019 A1 Aug. 9, 2012

Related U.S. Application Data

(63) Continuation of application No. 12/108,768, filed on Apr. 24, 2008, now Pat. No. 8,185,727.

(51) Int. Cl.
*G06F 9/00* (2006.01)
*G06F 15/177* (2006.01)

(52) U.S. Cl.
USPC .................................. 713/2; 713/1; 713/100

(58) Field of Classification Search
USPC ................................................ 713/1, 2, 100
See application file for complete search history.

(56) References Cited

U.S. PATENT DOCUMENTS

| | | | |
|---|---|---|---|
| 6,990,685 B1 * | 1/2006 | Christensen et al. | 726/34 |
| 7,302,559 B2 | 11/2007 | Oguma | |
| 7,305,539 B2 | 12/2007 | Brčin et al. | |
| 7,536,541 B2 * | 5/2009 | Isaacson | 713/2 |
| 7,590,838 B2 | 9/2009 | Oguma | |
| 7,614,050 B2 | 11/2009 | Sasaki et al. | |
| 7,886,140 B2 | 2/2011 | Jiang | |
| 2003/0014622 A1 | 1/2003 | Larvoire | |
| 2004/0255106 A1 | 12/2004 | Rothman et al. | |
| 2005/0223210 A1 | 10/2005 | Sasaki et al. | |
| 2006/0041738 A1 | 2/2006 | Lai | |
| 2006/0085628 A1 | 4/2006 | Brčin et al. | |
| 2006/0179326 A1 | 8/2006 | Leung | |
| 2006/0212695 A1 | 9/2006 | Oguma | |
| 2006/0288197 A1 | 12/2006 | Swanson et al. | |
| 2007/0260912 A1 | 11/2007 | Hatasaki et al. | |
| 2008/0155331 A1 | 6/2008 | Rothman et al. | |
| 2009/0049293 A1 | 2/2009 | Jiang | |
| 2009/0172135 A1 | 7/2009 | Carbin et al. | |
| 2009/0178141 A1 | 7/2009 | Panasyuk | |
| 2009/0271600 A1 | 10/2009 | Joshi et al. | |
| 2009/0276612 A1 | 11/2009 | Holdaway et al. | |

* cited by examiner

*Primary Examiner* — Jaweed A Abbaszadeh
(74) *Attorney, Agent, or Firm* — Larson Newman, LLP (57) ABSTRACT

A method includes detecting a storage device that has a boot file and a relative path name that corresponds to the boot file, determining a hardware path name corresponding to the storage device, obtaining from the storage device the relative path name, combining the hardware path name and the relative path name to generate a full path name to the boot file, and storing the full path name within a persistent memory.

17 Claims, 6 Drawing Sheets

| Device Path | Acpi(PNP0A08,0x0)/Pci(0x1F,0x2)/Ata(Primary,Master,0x0)/HD(1,GPT,9B2321EA-8F0E-4C9D-9F4C-96C52C164CAD,0x800,0x64000)/\EFI\Microsoft\Boot\bootmgfw.efi |
|---|---|
| String | Windows Boot Manager |
| Boot Parameters | 7F FF 04 00 57 49 4E 44 4F 57 53 00 00 01 00 00 00 ......... |

602 — Device Path row
604 — String row
606 — Boot Parameters row

FIG. 7

| Device Path | Acpi(PNP0A08,0x0)/Pci(0x1F,0x2)/Ata(Primary,Master,0x0)/HD(1,MBR,0x000C143A,0x3F,0x65F5B)/\EFI\SuSE\elilo.efi |
|---|---|
| String | Open SUSE EFI boot |
| Boot Parameters | 00 |

702 — Device Path row
704 — String row
706 — Boot Parameters row

FIG. 8

METHOD OF USING AN INFORMATION HANDLING SYSTEM HAVING A BOOT FILE, AND AN INFORMATION HANDLING SYSTEM AND MACHINE-EXECUTABLE CODE FOR CARRYING OUT THE METHOD

CROSS REFERENCE TO RELATED APPLICATIONS

This application is a continuation of U.S. patent application Ser. No. 12/108,768, entitled "Method of Using an Information Handling System Having a Boot File, and an Information Handling System and Machine-Executable Code for Carrying Out the Method," filed on Apr. 24, 2008, the disclosure of which is hereby expressly incorporated by reference in its entirety.

FIELD OF THE DISCLOSURE

This disclosure relates generally to information handling systems, methods and code used by information handling systems, and more particularly to methods of using information handling systems having boot files and information handling systems and machine-executable code for carrying out the methods.

DESCRIPTION OF THE RELATED ART

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

An information handling system may or may not have a unified extensive firmware interface (UEFI). If the information handling system does not have the UEFI, when the information handling system is booted, the basic input/output system (BIOS) locates a master boot record (MBR) within a hard drive. The MBR includes a pointer to a boot file and boot parameters used when loading the operating system. The location of the MBR is within the first sector of a hard drive.

Alternatively, the hard drive can have a globally unique identifier partition table (GPT). A hard drive with the GPT has a first sector that includes a protected master boot record (PMBR). The PMBR is a dummy sector that conventionally is not used. When the information handling system is booted, the BIOS accesses a nonvolatile random-access memory (NVRAM) to obtain a boot variable that includes a pointer to a boot file on the hard drive. If the hard drive is replaced with another hard drive having a GPT, the pointer to the boot file in the NVRAM is no longer valid because the pointer is pointing to a file on the hard disk that was replaced. Thus, a human will need to assist the information handling system in locating the pointer. The human interaction can be time consuming, annoying, or both. Further, if the human does not have sufficient knowledge regarding information handling systems, the human may not be able to properly locate the pointer, and thus, not boot the information handling system without technical support.

BRIEF DESCRIPTION OF THE DRAWINGS

Skilled artisans appreciate that elements in the figures are illustrated for simplicity and clarity and have not necessarily been drawn to scale. For example, the dimensions of some of the elements in the figures may be exaggerated or minimized relative to other elements to help to improve understanding of embodiments of the invention. Embodiments incorporating teachings of the present disclosure are illustrated and described with respect to the drawings presented herein.

The use of the same reference symbols in different figures indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile (e.g. random access memory, etc.), nonvolatile (read only} memory, flash memory etc.) or any combination thereof), one or more processing resources, such as a central processing unit (CPU), hardware or software control logic, or any combination thereof. Additional components of the information handling system can include one or more storage devices, one or more communications ports for communicating with external devices as well as various input and output (I/O) devices, such as a keyboard, a mouse, a video display, or any combination thereof. The information handling system can also include one or more buses operable to transmit communications between the various hardware components.

Although referred to as a "device," the device may be configured as hardware, firmware, software, or any combination thereof. For example, the device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be firmware (such as any software running on an embedded device, a Pentium class or PowerPC™ brand processor, or other such device) or software (such as any software capable of operating in the relevant environment). The device could also be a combination of any of the foregoing examples of hardware, firmware, or software.

Devices or programs that are in communication with one another need not be in continuous communication with each other unless expressly specified otherwise. In addition, devices or programs that are in communication with one another may communicate directly or indirectly through one or more intermediaries.

Embodiments discussed below describe, in part, distributed computing solutions that manage all or part of a communicative interaction between network elements. In this context, a communicative interaction may be intending to send information, sending information, requesting information, receiving information, receiving a request for information, or any combination thereof. As such, a communicative interaction could be unidirectional, bi-directional, multi-directional, or any combination thereof. In some circumstances, a communicative interaction could be relatively complex and involve two or more network elements. For example, a communicative interaction may be "a conversation" or series of related communications between a client and a server—each network element sending and receiving information to and from the other. Whatever form the communicative interaction takes, the network elements involved need not take any specific form. A network element may be a node, a piece of hardware, software, firmware, middleware, some other component of a computing system, or any combination thereof.

In the description below, a flow charted technique may be described in a series of sequential actions. The sequence of the actions and the party performing the steps may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the computing, electronics, and software arts.

An information handling system and method of using it are described below. An exemplary, non-limiting system description is described before addressing methods of using it. Some of the functionality of modules within the system is described with the system. The utility of the system and its modules will become more apparent with the description of the methods that follow the description of the system and modules.

Figure 1:
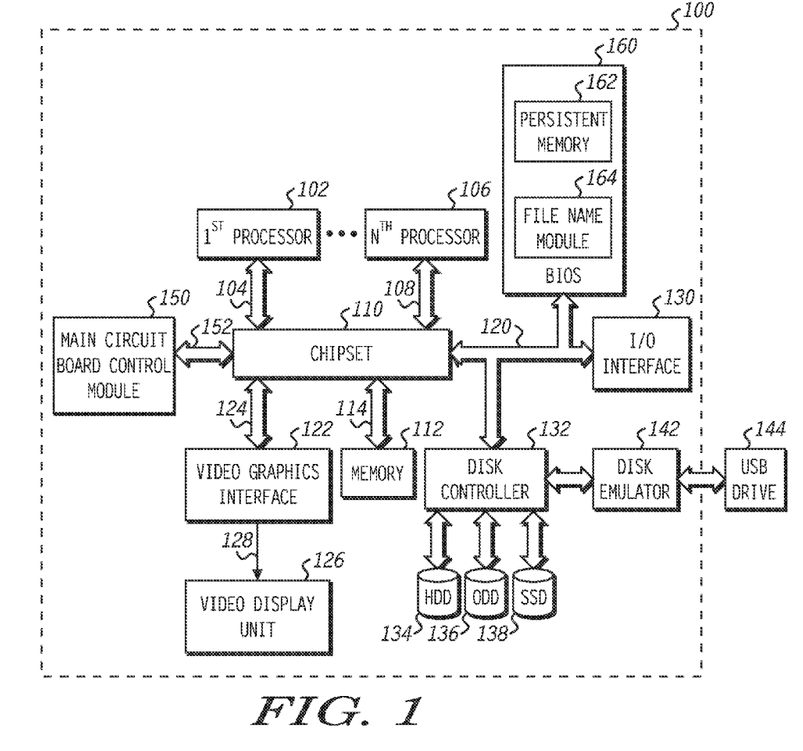
FIG. 1 includes a functional block diagram of an information handling system including a basic input/output system, a disk controller, and storage devices.

FIG. 1 illustrates a functional block diagram of an exemplary embodiment of an information handling system, generally designated at 100. In one form, the information handling system 100 can be a computer system such as a server. Alternatively, the information handling system 100 can include a desktop computer, a laptop computer, another similar computer, a rack of computers (e.g., networked servers), or any combination thereof. Other implementations can be used. After reading this specification, skilled artisans will appreciate that the information handling system can be configured to their particular needs or desires.

As illustrated in FIG. 1, the information handling system 100 can include a physical processor 102 coupled to a host bus 104 and can further include additional processors generally designated as $n^{th}$ physical processor 106 coupled to another host bus 108. The physical processor 102 can be coupled to a chipset 110 via the host bus 104. Further, the physical processor 106 can be coupled to the chipset 110 via the host bus 108. The chipset 110 can support multiple processors and can allow for simultaneous processing of multiple processors and support the exchange of info nation within information handling system 100 during multiple processing operations.

According to one aspect, the chipset 110 can be referred to as a memory hub or a memory controller. For example, the chipset 110 can include an Accelerated Hub Architecture (AHA) that uses a dedicated bus to transfer data between the physical processor 102 and the physical processor 106. For example, the chipset 110 including an AHA enabled-chipset can include a memory controller hub and an input/output (I/O) controller hub. As a memory controller hub, the chipset 110 can function to provide access to the physical processor 102 using the host bus 104 and the physical processor 106 using the host bus 108. The chipset 110 can also provide a memory interface for accessing memory 112 using a still another host bus 114. In a particular embodiment, the host buses 104, 108, and 114 can be individual buses or part of the same bus. The chipset 110 can also provide bus control and can handle transfers between the host buses 104, 108, and 114. After reading the specification, skilled artisans will appreciate that the information handling system 100 is not limited to any particular architecture with respect to the processors. For example, the architecture can allow for complex processor to complex processor communications.

According to another aspect, the chipset 110 can be generally considered an application specific chipset that provides connectivity to various buses, and integrates other system functions. For example, the chipset 110 can be provided using an Intel®-brand Hub Architecture (IHA) chipset also that can include two parts, a Graphics and Accelerated Graphics Port (AGP) Memory Controller Hub (GMCH) and an I/O Controller Hub (ICH). The chipset 110 can also be packaged as an application specific integrated circuit (ASIC).

The information handling system 100 can also include a video/graphic interface module 122 that can be connected to the chipset 110 using host bus 124. The video/graphic module 122 includes two or more video/graphic ports, such as a video/graphics port and a video/graphic port, capable of providing image information substantially simultaneously to a common video/graphics display device 126 for substantially simultaneous display as described in greater detail herein. Also, each of the video/graphic ports are capable of providing image information to separate video/graphic devices for substantially simultaneous display. The video/graphic display device 126 is also referred to herein as a display unit 126. The display unit 126 can include one or more types of video/graphic display devices, such as a flat panel display (FPD) or other type of display device.

The information handling system 100 can also include an I/O interface module 130 that can be connected via an I/O bus 120 to the chipset 110. The I/O bus 120 and the I/O interface 130 can include industry standard buses or proprietary buses and respective interfaces or controllers. For example, the I/O bus 120 can be a PCI bus that can operate at approximately 66 MHz or a PCI-Express bus can be operated at more than one (1) speed (e.g. 2.5 GHz and 5 GHz). PCI buses and PCI-Express buses can comply with industry standards for connecting and communicating between various PCI-enabled hardware devices. Other buses can also be used in association with, or independent of the I/O bus 120 including, but not limited to, industry standard buses or proprietary buses, such as Industry Standard Architecture (ISA), Small Computer Serial Interface (SCSI), Inter-Integrated Circuit (I²C), System Packet Interface (SPI), or Universal Serial buses (USBs).

In an alternate embodiment, the chipset 110 can be a chipset employing a Northbridge/Southbridge chipset configuration (not separately illustrated). For example, a Northbridge portion of the chipset 110 can communicate with the processor 102 and can control interaction with the memory 112, interaction with bus 120, which can be a PCI bus, and interactions with bus 124 which can be a PCI bus or an AGP bus. The Northbridge portion can also communicate with the processor 102 using host bus 104 and with the processor 106 using the host bus 108. The chipset 110 can also include a Southbridge portion that can handle I/O functions of the chipset 110. The Southbridge portion can manage the basic forms of I/O such as USB, serial I/O, audio outputs, Integrated Drive Electronics (IDE), and ISA I/O for the information handling system 100.

The information handling system 100 can further include a disk controller 132 connected to the bus 120. The disk controller 132 can be used to connect one or more disk drives such as a hard disk drive (HDD) 134, an optical disk drive (ODD) 136 such as a Read/Write Compact Disk (R/W-CD), a Read/Write Digital Video Disk (R/W-DVD), a Read/Write mini Digital Video Disk (R/W mini-DVD), or other type of optical disk drive, and a solid-state drive (SSD) 138. As used herein, a solid-state drive refers to memory acting as a drive but has no moving parts.

The information handling system 100 can further include main circuit board control module 150 that can be coupled to the chipset 110 via a system communication bus 152, such as a control bus. The main circuit board control module 150 may reside on a main circuit board, such as a baseboard, a motherboard, or the like. Although not illustrated, other components, such as the processors (processor 102 through the processor 106), the video display unit 126, the video graphic interface 122, the memory 112, and the disk controller 132 can be coupled to the main circuit board control module 150. Commands, communications, or other signals may be sent to or received from the main circuit board control module 150 by any one or combination of components previously described. The main circuit board control module 150 of an integrated circuit or a chip set within the information handling system 100.

The information handling system 100 can also include basic input/output system (BIOS) module 160 that can be coupled to the I/O bus 120. The BIOS module 160 is operable to detect and identify components within the information handling system 100 and to provide the appropriate drivers for those components. The BIOS module 160 can be operable during a boot sequence and provide information needed to properly boot the information handling system 100 before, during, and after an operating system for the information handling system 100 is launched. The BIOS module 160 includes a persistent memory 162 that can include a nonvolatile random-access memory, flash memory, read-only memory (e.g., one-time programmable, electrically erasable and programmable), field programmable gate array, or the like. The persistent memory 162 is operable to retain information when power to the information handling system is removed. The significance of the persistent memory 162 will become more apparent when describing a booting sequence. The BIOS module 160 can further include a file name module 164. The file name module 164 can be operable to combine a hardware path name and a relative path name of a file to generate a full path name corresponding to the file. The file name module 164 can also be operable to parse a full path name corresponding to a file into a hardware path name and a relative path name corresponding to the file, in addition to or instead of being operable to combing hardware and relative path names.

Figure 2:
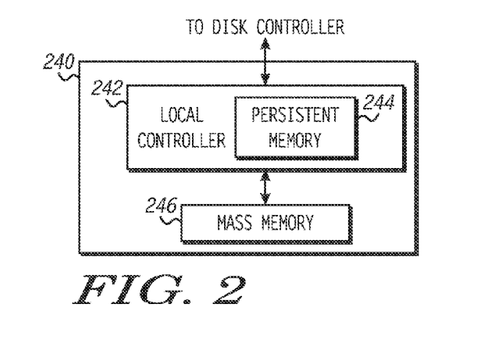
FIG. 2 includes a block diagram of a drive that can be used with the information handling system of FIG. 1.

FIG. 2 includes a block diagram of a drive 240 that is coupled to a disk controller, such as disk controller 132. The drive 240 can be the HDD 134, ODD 136, SSD 138, USB drive 144, or another suitable drive. The drive 240 includes a local controller 242 that is coupled to a disk controller, such as the disk controller 132, and mass memory 246. The local controller 242 is operable to control read and write operations within the drive 240 and to receive and provide data to the information handling system via the disk controller.

The drive 240 can also include persistent memory 244. The persistent memory 244 can be part of the local controller 242 (as illustrated in FIG. 2) or may be separate from the local controller 242 (not illustrated). If separate from the local controller 242, the drive 240 is configured such that the persistent memory 244 is coupled to the local controller 242. The persistent memory 244 can include any of the memories as described with respect to the persistent memory 162. The persistent memories 162 and 244 can be the same type or different types of memories. The significance of the persistent memory 244 will become more apparent when describing a booting sequence.

The drive 240 further includes mass memory 246 that includes content (e.g., files, tables, etc.) and metadata (e.g., file directories, pointers to files, etc.) corresponding to the content. In a HDD or an ODD, the mass memory 246 can include information on the disk itself. The mass memory 246 can include partitions, reserved or unreserved portions, or other organizations for particular applications.

In an embodiment, the drive 240 can have a master boot record (MBR), including a pointer to the boot file, within the first sector of the mass memory 246. The BIOS 160 can locate the MBR because the MBR is within the first sector, and accordingly, can locate the pointer to the boot file that is part of the MBR. The boot file can be executed and load the operating system. As used herein, such a drive that has the MBR, is referred to as an MBR-formatted drive. An MBR-formatted drive typically has only one operating system.

In another embodiment, the drive 240 can be formatted to have a globally unique identifier partition table (GPT), which is herein referred to as a GPT-formatted drive. In a GPT-formatted drive, the first sector within the mass memory 246 has a protected master boot record (PMBR). The PMBR may allow the GPT-formatted drive to be used with an information handling system that does not use the UEFI.

As between different GPT-formatted drives, the locations for pointers to the boot files may vary. Further, the GPT-formatted drive can have more than one operating system within the mass memory 246. As described below, an automated system can be used to discover pointer(s) to boot file(s) within the GPT-formatted drive, even if the persistent memory 162 within the BIOS 160 has an invalid pointer.

Attention is now directed to methods of booting information handling systems with MBR-formatted and GPT-formatting drives. If the information handling system 100 does has an MBR-formatted drive and not have the software interface between firmware and the boot loader (e.g., no UEFI), when the information handling system 100 is started or restarted, the BIOS module 160 accesses the MBR within the first sector of the drive 240 to locate the boot entries, including the pointer to the boot file. The booting of the information handling system 100 and loading of the operating system can proceed using a conventional or proprietary technique.

If the information handling system 100 has the software interface (e.g., has the UEFI), when the information handling system is started or restarted, the BIOS module 160 can access the boot variable within the persistent memory 162. The boot variable includes, inter alia, the full path name of the pointer to a boot file, a character string describing a boot type (e.g., Window™-brand boot manager, open source boot manager, Solaris™-brand boot manager, Mac OS™-brand boot manager, etc.), and boot parameters. If the drive 240 is the same drive used before starting or restarting, the information handling system can boot and load the operating system using a conventional or proprietary technique.

In another embodiment, a prior drive within the information handling system 100 may have been replaced by the drive 240. If the information handling system 100 uses the software interface, the boot variable within the persistent memory 162 is no longer valid. An automated method can be employed to boot the information handling system 100.

Figure 3:
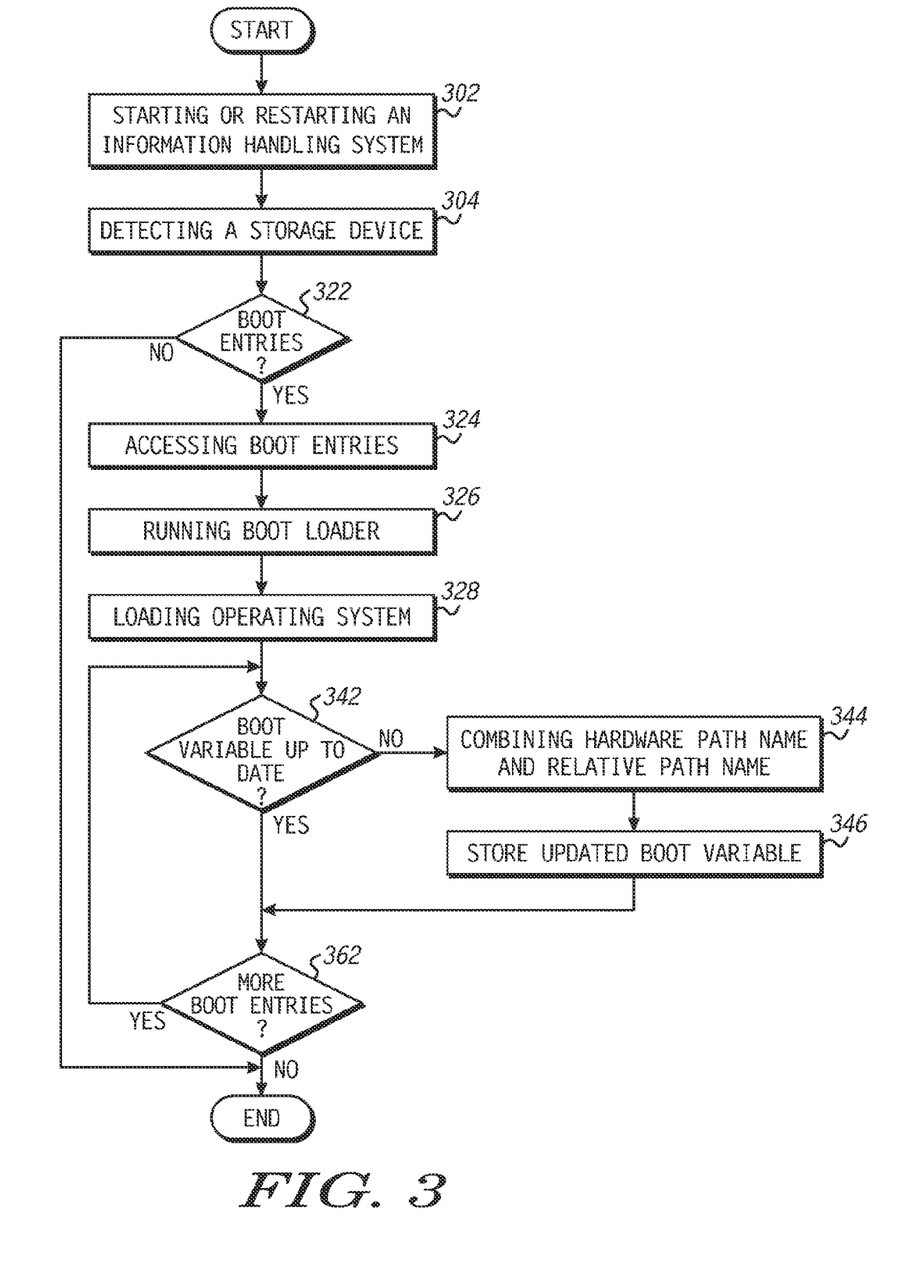
FIG. 3 includes a flow diagram of booting an information handling system and updating boot information within the information handling system.

FIG. 3 includes a flow chart to illustrate a method of booting the information handling system 100 in accordance with a particular embodiment. The drive that included the prior boot variable has been replaced before the method as illustrated in FIG. 3 begins. The method includes starting or restarting an information handling system, at block 302. The information handling system 100 initiates the BIOS module 160, and the booting sequence starts. The method can also include detecting a storage device, at block 304. The BIOS module 160 may perform functions including detecting peripheral equipment, e.g., drive(s) that are coupled to the disk controller 132. The information handling system 100 may initially detect the drive(s) as being block I/O device(s). The BIOS module 160 may detect the channel to which each drive is connected. The BIOS module 160 can determine the hardware path to the drive(s) and assign hardware path name(s) accordingly.

Figure 4:
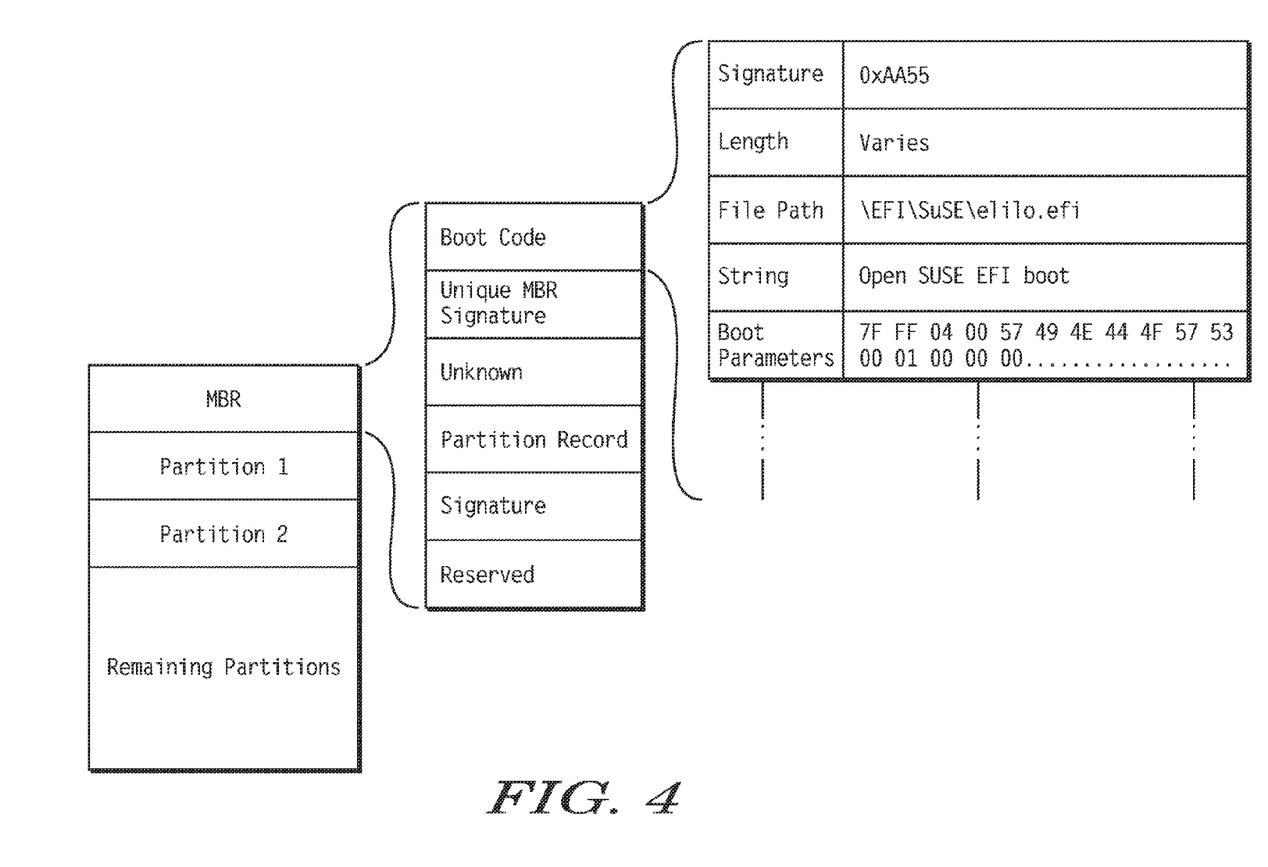
FIG. 4 includes an illustration of an exemplary data organization within a drive having a master boot record.

The method can further include determining if a particular drive has boot entries, at decision tree 322. The BIOS module 160 can access the MBR for an MBR-formatted drive. The MBR can include, inter alia, a boot entry that includes a pointer having the relative path name for the boot file on that drive, a character string describing the boot type, and boot parameters to be used during the boot sequence. FIG. 4 includes an illustration of a portion of an MBR-formatted drive including boot entries within the MBR.

Figure 5:
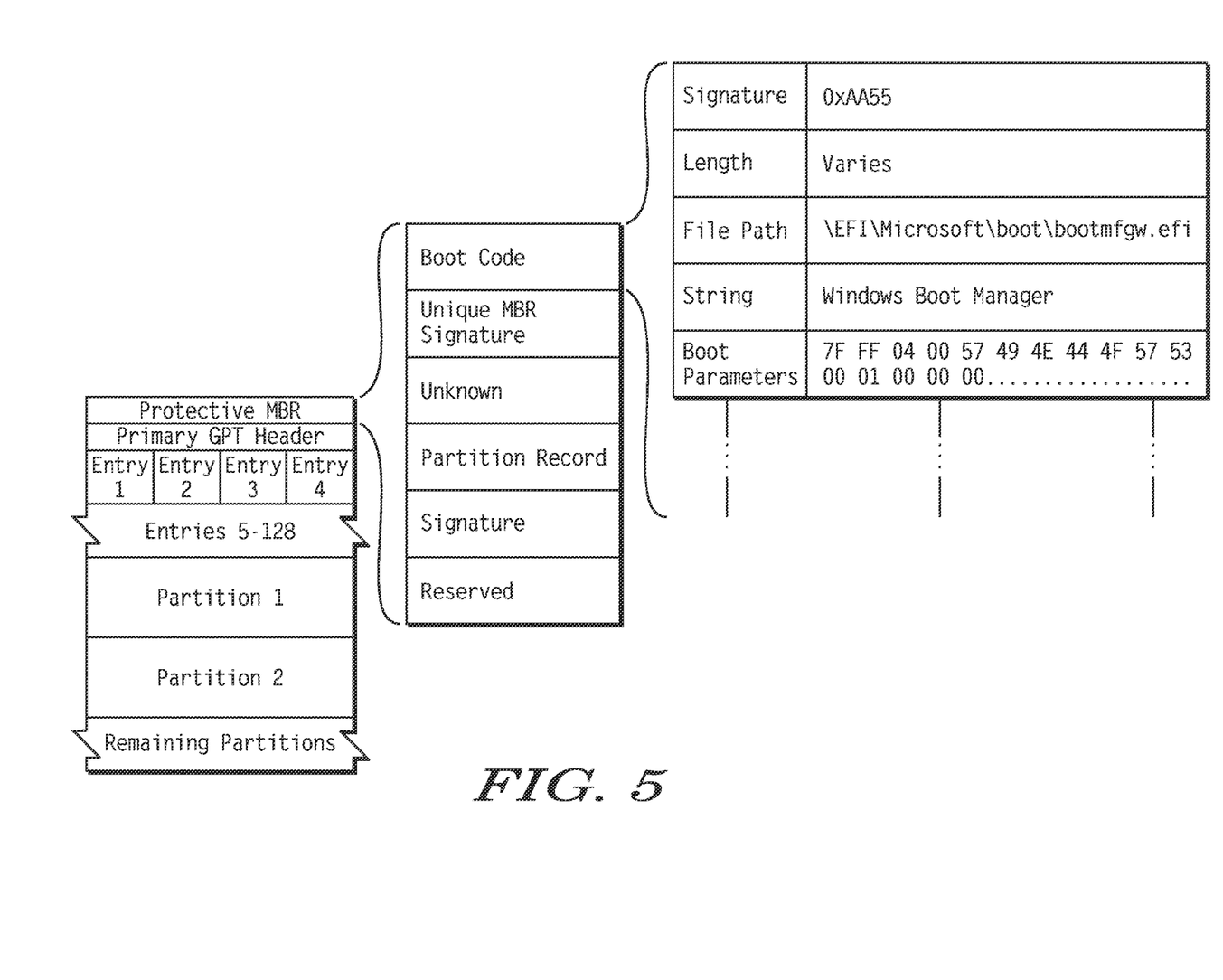
FIG. 5 includes an illustration of an exemplary data organization within a drive having a globally unique identifier partition table.

In still another embodiment, an information handling system can have the software interface and a GPT-formatted drive. The boot entries may be at nearly any location within the GPT-formatted drive. In a particular embodiment, the persistent memory 244 within the drive 240 can be used to locate the boot entries. In another particular embodiment, a dedicated partition can be used, such as the PMBR (which is an otherwise unused sector of the mass memory 246 in a GPT-formatted drive) or a UEFI partition that includes information that can be used by the UEFI. FIG. 5 includes an illustration of a GPT-formatted drive including boot entries within the PMBR when the PMBR includes the boot entries. In still another particular embodiment, a search can be performed using key characters or words (e.g., "boot," filenames ending in "efi," other suitable characters or words, or any combination thereof).

More than one operating system may be discovered on a particular drive or a combination of drives. When more than one operating system is discovered, the information handling system 100 can address this situation in different ways. The BIOS module 160 may have logic that effectively defaults to a particular boot loader (e.g., attempt to boot using the first set of boot entries found, attempt to boot using the most recently installed operating system, or the like). In another embodiment, the BIOS module 160 may have logic that can eliminate a particular operating system from being loaded. For example, if the BIOS module 160 is designed for a Windows™-brand based operating system, the BIOS module 160 may not attempt to access boot entries for a Mac OS™-brand operating system. In still another embodiment, the BIOS module 160 may display a list of potential operating systems that exist within the drive(s) or limit the list to only those operating systems that will be capable of properly operating with the information handling system 100. A human or other user can select which operating system to be used.

If no boot entries are found ("No" branch of decision tree 322), the method can end. Otherwise, the method can continue ("Yes" branch of decision tree 322) and include accessing boot entries, at block 324. Regardless of how the particular operating system and boot entries are selected, as previously described, the BIOS module 160 accesses the boot entries to locate the pointer to the boot file. The method can also include running the boot loader and loading the operating system, at blocks 326 and 328. The boot loader corresponds to the boot file and performs the boot sequence. The boot loader is responsible for loading the operating system. The boot parameters can be used when loading the operating system.

Figure 6:
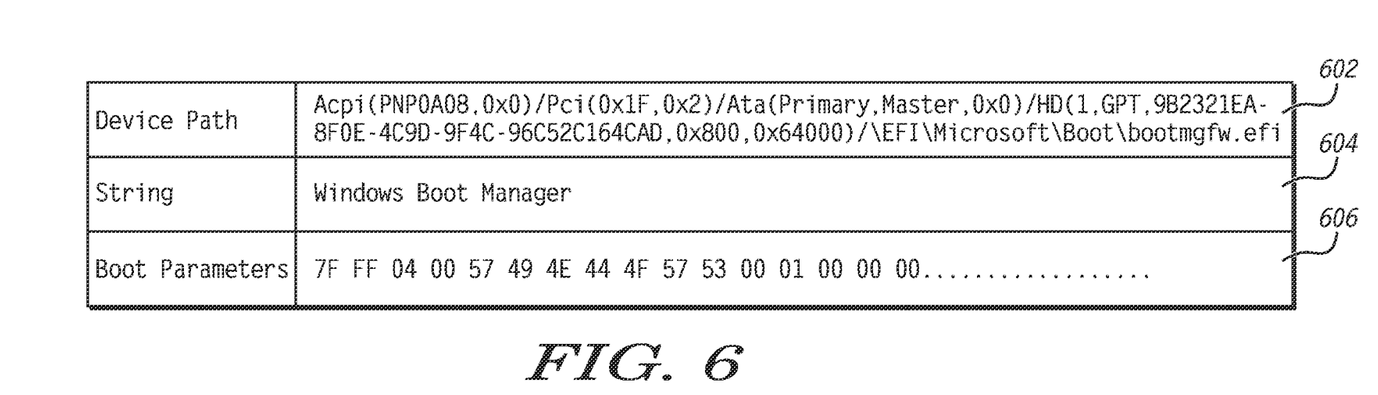
FIGS. 6 and 7 include illustrations of information within different boot variables for different operating systems.
Figure 7:
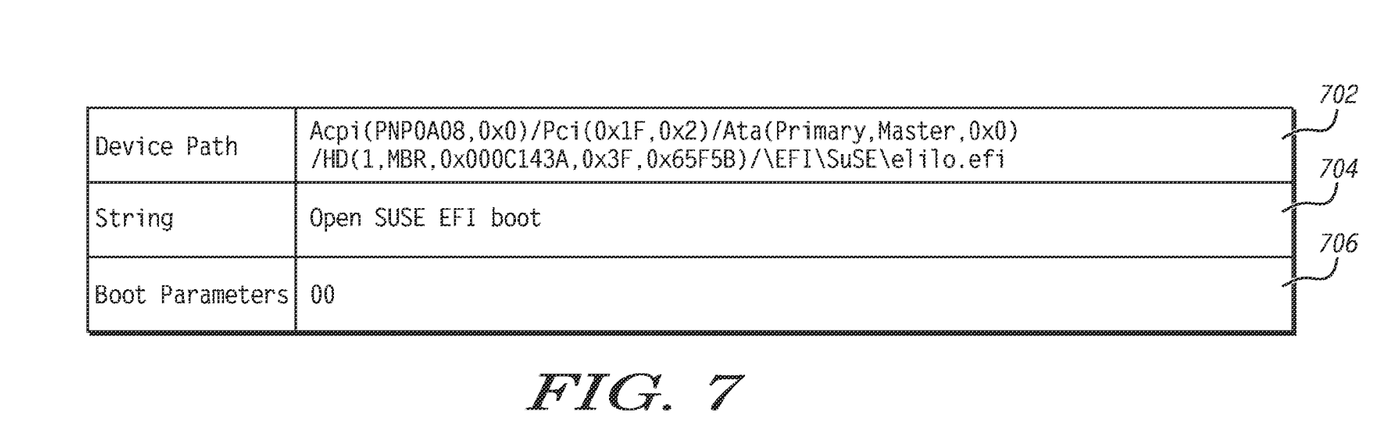

During or after loading the operating system, a determination can be made whether the boot variable in persistent memory 162 is up to date, at decision tree 342. If the boot variable is not up to date, the file name module 164 can combine the hardware path name with the relative path name (corresponding to the relative path to the boot file within the particular drive) to generate the full path name to the boot file. If any of the boot parameters changed, such boot parameter(s) can be updated. If needed or desired, the character string describing the boot type can also be updated. The updated information can be stored in the boot variable within the persistent memory 162. FIGS. 6 and 7 include exemplary, non-limiting boot variables for different operating systems. The boot variables include the full path name 602 in FIG. 6 and 702 in FIG. 7, the descriptive character string 604 in FIG. 6 and 704 in FIG. 7, and boot parameters 606 in FIG. 6, and 706 in FIG. 7. In another embodiment, more information or less information may be used with the boot variable.

A determination can be made whether there are any further boot entries, at decision tree 362. If so, the method can be iterated by returning to decision tree 342. If there are no further boot entries ("No" branch of decision tree 362) or if the boot variable in persistent memory 162 is up to date ("Yes" branch of decision tree 342), the method can end.

Figure 8:
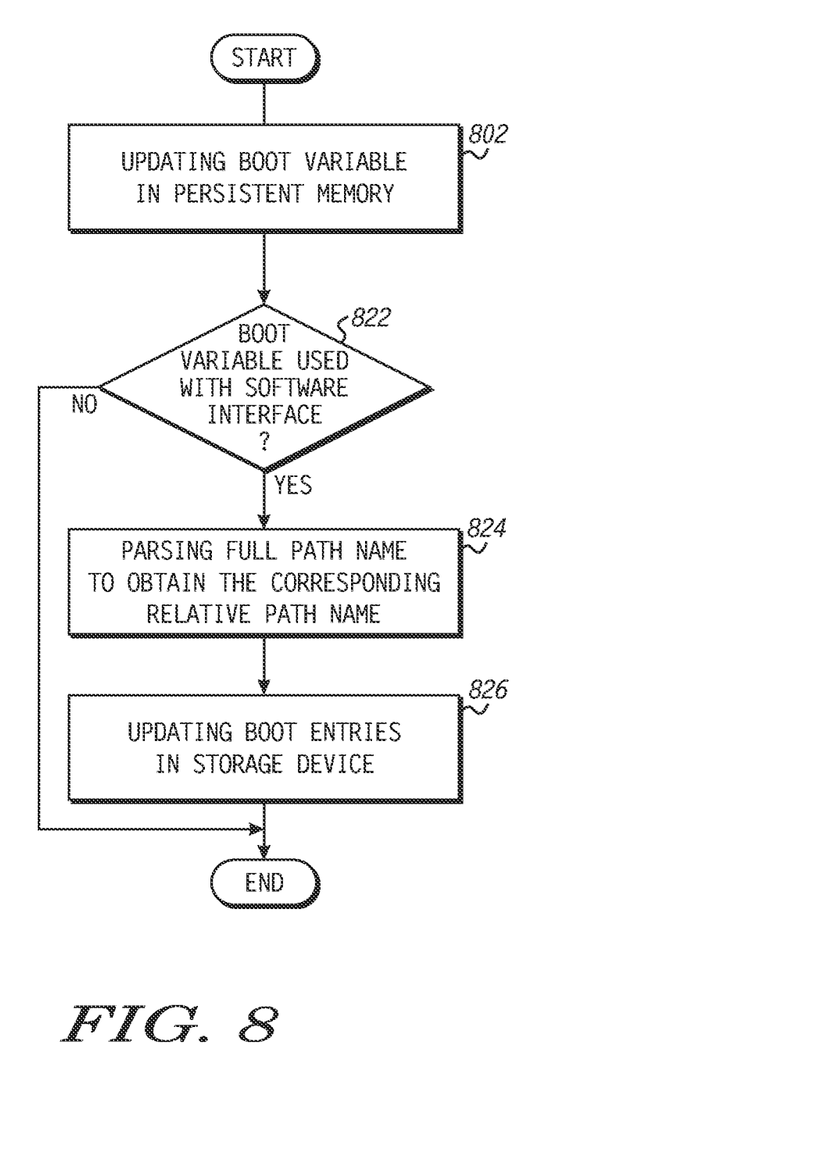
FIG. 8 includes a flow diagram of updating a boot variable and boot entries.

FIG. 8 includes a flow chart for an embodiment in which an updated boot variable within the persistent memory 162 can be used to update corresponding information for boot entries within the drive 240 when used in an information handling system having the software interface. The method can include updating the boot variable in the persistent memory, at block 802. This operation can be performed as described with respect to blocks 344 and 346 in FIG. 3. The method can also include determining whether the boot variable is used in an information handling system having a software interface (e.g., UEFI) between the firmware platform and the boot loader, at decision tree 822 in FIG. 8. If the information handling system does not have the software interface ("No" branch of decision tree 822), the method can end. Otherwise ("Yes" branch of decision tree 822), the method can also include parsing the full path name to obtain the corresponding relative path name, at block 824. The file name module 164 can perform the parsing. Boot parameters and potentially other information may have also changed. The method can include updating boot entries in the storage device, at block 826. If the starting location of the boot entries changed, a pointer to the new starting location can be updated in the persistent memory 244 within the drive. In addition or alternatively, boot entries within the mass memory 246 (e.g., within the PMBR, UEFI partition, or other location within mass memory 246) can be updated in addition to or instead of the persistent memory 244. Otherwise, the information within the persistent memory 244 may not need to be changed. The method may then end.

Embodiments as described herein can be used for booting sequences in information handling systems with or without a software interface between a firmware platform and a boot loader and with different formats of drives. The methods can be useful in situations in which drives are replaced or added to an information handling system. Even with a currently invalid pointer to a boot file within a boot variable, the information handling system can automatically discover boot entries within a new drive, run the boot file, and load the operating system. If more than one operating system is present, the information handling system may include logic that defaults to a particular operating system, automatically selects a particular operating system using a predetermined criterion, does not load an incompatible operating system, or the like. Alternatively, the information handling system can display a list of operating systems and let a human choose which particular operating system to use. The information handling system can then access the corresponding boot entries, run the boot loader, and load the operating system. The method and system can be useful, particularly in applications where disk drives may be replaced or when an inexperienced user is trying to start or restart the information handling system.

Many different aspects and embodiments are possible. Some of those aspects and embodiments are described below. After reading this specification, skilled artisans will appreciate that those aspects and embodiments are only illustrative and do not limit the scope of the present invention.

In a first aspect, a method of using an information handling system can further include detecting a first storage device, wherein the first storage device has a first boot file and, during detecting, a location of a first relative path name, corresponding to the first boot file within the first storage device, is unknown to a BIOS module of the information handling system. The method can also include determining a first hardware path name corresponding to the first storage device, obtaining, from the first storage device, the first relative path name corresponding to the first boot file, and combining the first hardware path name and the first relative path name to generate a first full path name to the first boot file. The method can further include storing the first full path name within a first persistent memory, wherein the first persistent memory is separate from the storage device.

In an embodiment of the first aspect, the information handling system includes an interface between firmware and a boot loader, wherein the interface is operable to use the full path name to locate the boot file. In another embodiment, the method further includes restarting the information handling system, reading the first full path name from the persistent memory, and locating the first boot file by the using the full path name. In still another embodiment, the method further includes restarting the information handling system, reading the first full path name from the persistent memory, determining that the first boot file cannot be located. The method can also include detecting a second storage device, wherein the second storage device has a second boot file, determining a second hardware path name corresponding to the second storage device, obtaining, from the second storage device, the second relative path name corresponding to the second boot file, combining the second hardware path name and the second relative path name to generate a second full path name to the second boot file, and storing the second full path name within the first persistent memory.

In a further embodiment of the first aspect, the method further includes determining that the first storage device includes a second boot file different from the first boot file, requesting a user to select a particular boot file to be used by the information handling system, and receiving input corresponding to a selection of the particular boot file. In still a further embodiment, the method further includes determining that the first storage device includes a second boot file different from the first boot file, and automatically determining which of the first boot file or the second boot file is to be used by the information handling system.

In yet a further embodiment of the first aspect, the first storage device includes a second persistent memory that includes a location of the first relative path name. In a particular embodiment, the location is outside the first sector of the storage device. In another embodiment, the method further includes using the first boot file to load an operating system, storing boot parameters into the first persistent memory, and storing the boot parameters within the first storage device. In still another embodiment, the information handling system includes an extensible firmware interface.

In a second aspect, machine-executable code, for an information handling system, can be embedded within a tangible medium and includes instructions for carrying out a method. The method can include parsing a full path name corresponding to a boot file within a storage device into a hardware path name corresponding to the storage device and a relative path name that is a path name within the storage device corresponding to the boot file, and storing the full path name within a persistent memory.

In an embodiment of the second aspect, the method further includes detecting the storage device, wherein the storage device has the boot file, determining the hardware path name to the storage device, obtaining a relative path name to the boot file from the storage device, and accessing the boot file. In a particular embodiment, the method further includes loading an operating system, wherein boot parameters are used during loading, storing the boot parameters within the persistent memory, and storing the boot parameters within the storage device. In another embodiment, the information handling system further includes an extensible firmware interface.

In a third aspect, an information handling system can include a storage device including a boot file and a relative path name to the boot file, and a persistent memory including a full path name to a boot file, wherein the full path name includes the relative path name and a hardware path name to the storage device.

In an embodiment of the third aspect, the storage device includes first data corresponding to boot parameters, and the persistent memory includes second data corresponding to the boot parameters. In another embodiment, the information handling system further includes a file name module operable to combine the hardware path name and the relative path name to generate the full path name. In still another embodiment, the information handling system further includes a file name module operable to parse the full path name into the hardware path name and the relative path name. In a further embodiment, the persistent memory includes a nonvolatile random-access memory, and the storage device is a hard disk drive, an optical disk drive, or a solid-state drive. In yet a further embodiment, the information handling system further includes an extensible firmware interface operable to provide an interface between firmware and the boot loader.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of using an information handling system, the method comprising:
    detecting a first storage device, wherein the first storage device includes a first boot file and a first relative path name that corresponds to the first boot file;
    determining a first hardware path name corresponding to the first storage device;
    obtaining from the first storage device the first relative path name;
    combining the first hardware path name and the first relative path name to generate a first full path name to the first boot file;
    storing the first full path name within a persistent memory, wherein the persistent memory is separate from the first storage device;
    restarting the information handling system;
    reading the first full path name from the persistent memory;
    determining that the first boot file cannot be located;
    detecting a second storage device, wherein the second storage device has a second boot file;
    determining a second hardware path name corresponding to the second storage device;
    obtaining, from the second storage device, a second relative path name corresponding to the second boot file;
    combining the second hardware path name and the second relative path name to generate a second full path name to the second boot file; and storing the second full path name within the persistent memory.

2. The method of claim 1, wherein the information handling system includes an interface between firmware and a boot loader, wherein the interface is operable to use the full path name to locate the first boot file.

3. The method of claim 1, further comprising:
locating the first boot file by the using the full path name in response to reading the first full path name.

4. The method of claim 1, further comprising:
determining that the first storage device comprises a second boot file different from the first boot file;
requesting a user to select a particular boot file to be used by the information handling system; and
receiving input corresponding to a selection of the particular boot file.

5. The method of claim 1, further comprising:
determining that the first storage device comprises a second boot file different from the first boot file; and
automatically determining which of the first boot file or the second boot file is to be used by the information handling system.

6. The method of claim 1, wherein the location of the first relative path name is outside a first sector of the storage device.

7. The method of claim 1, further comprising:
using the first boot file to load an operating system;
storing boot parameters into the persistent memory; and
storing the boot parameters within the first storage device.

8. An information handling system comprising:
a first storage device having a first boot file and a first relative path name that corresponds to the first boot file; and
a persistent memory that is separate from the first storage device;
wherein the information handling system is operable to:
detect the first storage device, wherein during the detecting a location of the first relative path name is unknown to a BIOS module of the information handling system;
determine a first hardware path name corresponding to the first storage device;
obtain from the first storage device the first relative path name;
combine the first hardware path name and the first relative path name to generate a first full path name to the first boot file;
store the first full path name within the persistent memory;
restart the information handling system;
read the first full path name from the persistent memory;
determine that the first boot file cannot be located;
detect a second storage device, wherein the second storage device has a second boot file;
determine a second hardware path name corresponding to the second storage device;
obtain from the second storage device a second relative path name corresponding to the second boot file;
combine the second hardware path name and the second relative path name to generate a second full path name to the second boot file; and
store the second full path name within the persistent memory.

9. The information handling system of claim 8, wherein the information handling system is further comprising:
an interface between firmware and a boot loader, wherein the interface is operable to use the full path name to locate the first boot file.

10. The information handling system of claim 8, wherein the information handling system is further operable to:
locate the first boot file by the using the full path name in response to reading the first full path name.

11. The information handling system of claim 8, wherein the information handling system is further operable to:
determine that the first storage device comprises a second boot file different from the first boot file;
request a user to select a particular boot file to be used by the information handling system; and
receive an input corresponding to a selection of the particular boot file.

12. The information handling system of claim 8, wherein the information handling system is further operable to:
determine that the first storage device comprises a second boot file different from the first boot file; and
automatically determine which of the first boot file or the second boot file is to be used by the information handling system.

13. The information handling system of claim 8, wherein the location of the first relative path name is outside a first sector of the storage device.

14. The information handling system of claim 8, wherein the information handling system is further operable to:
use the first boot file to load an operating system;
store boot parameters into the persistent memory; and
store the boot parameters within the first storage device.

15. An apparatus comprising a processor and computer-readable medium including code to instruct the processor to:
detect a first storage device, wherein the first storage device includes a first boot file and a first relative path name that corresponds to the first boot file;
determine a first hardware path name corresponding to the first storage device;
obtain, from the first storage device, the first relative path name;
combine the first hardware path name and the first relative path name to generate a first full path name to the first boot file;
store the first full path name within a persistent memory, wherein the persistent memory is separate from the first storage device;
restart the information handling system;
read the first full path name from the persistent memory;
determine that the first boot file cannot be located;
detect a second storage device wherein the second storage device has a second boot file;
determine a second hardware path name corresponding to the second storage device;
obtain, from the second storage device, a second relative path name corresponding to the second boot file;
combine the second hardware path name and the second relative path name to generate a second full path name to the second boot file; and
store the second full path name within the persistent memory.

16. The apparatus of claim 15, the code further instructing the processor to:
locate the first boot file by the using the full path name in response to reading the first full path name.

17. The apparatus of claim 15, the code further instructing the processor to:
determine that the first storage device comprises a second boot file different from the first boot file;

request a user to select a particular boot file to be used by the information handling system; and
receive input corresponding to a selection of the particular boot file.

* * * * *